United States Patent Office 3,288,292
Patented Nov. 29, 1966

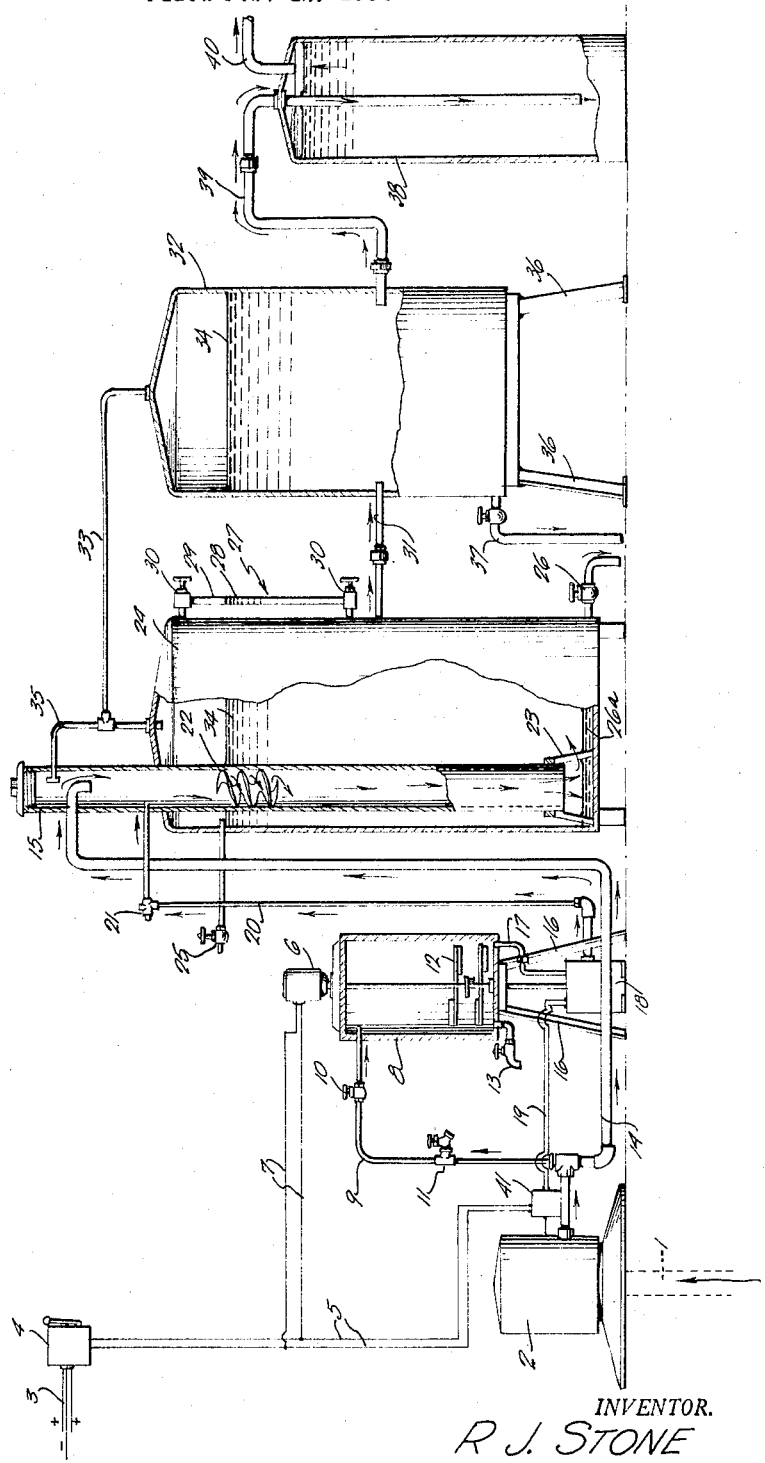

3,288,292
WATER SOFTENING PLANT
Raymond J. Stone, 1901 N. Council,
Oklahoma City, Okla.
Filed Feb. 12, 1964, Ser. No. 344,301
2 Claims. (Cl. 210—97)

This invention relates to new and useful improvements in the field of water softening, and more particularly to a water softening plant.

It is well known that well water and water from rivers and lakes generally must be treated to provide a soft, clear water for human and animal consumption, and for many domestic and industrial uses.

It is, therefore, an object of the instant invention to provide a water softening unit that will obtain a hardness of varying scope, anywhere from three to twelve grains.

Another object of this invention is to provide a water softening plant that is economical for the small user, for example, a consumer of from five gallons to fifty thousand gallons per day.

Still another object of this instant invention is to provide a water softening unit that does not require a differential in elevation to obtain the necessary pressure.

The instant invention obtains its water pressure from a well pump, which in turn supplies air pressure and water pressure to the treating tank and water supply tank.

These and other objects and purposes of the invention will be more fully realized and understood from the reading of the following detailed description and claims, when taken in conjunction with the accompanying drawing where there is shown a side elevational view of the invention partly broken away and in section.

Referring in detail to the drawing numeral 1 is a pipe providing water from a source, for example, a well. The water from pipe 1 is fed into a well water pump 2. A source of electric power is provided on lines 3 at a conventional fuse and switch box 4. Electric power is provided to the pump 2 and an automatic pressure switch 41 by lines 5 and to an agitator motor 6 by lines 7. The raw water is supplied to chemical supply tank 8 through a line 9. Appropriate control and bleed valves 10 and 11 respectively are provided in this line. Electric agitator motor 6 drives a continuously running agitator 12 within tank 8. The tank 8 has a waste removal outlet 13. A majority of the raw well water flows from pump 2 through line 14 under pressure from the pump to the downcomer 15.

The chemical tank 8 is supported by means of legs 16. Chemically treated water is removed from tank 8 by a line 17 to a pump 18 which obtains its electric power source from lines 19.

The chemical tank 8 is supported by means of legs 16. Chemically treated water is removed from tank 8 by a line 17 to a pump 18 which obtains its electric power source from lines 19. The chemical pump starts and stops with the well pump. Chemical is fed into downcomer 15 through line 20. A cross fitting for easy cleaning of this line is provided at 21.

The downcomer tube 15 is provided with a screw 22 which is used to mix the chemical and water as it is fed into the tube. Downcomer 15 has legs 23 which raise the bottom of the downcomer above the floor of a treating and settling tank 24 so that there is room for sludge or precipitate to settle in the bottom of the tank without clogging the downcomer.

Tank 24 is provided with an air vent 25 to release add air as desired to the tank. A valve and outlet 26 is provided to remove sludge from the bottom of tank 24. The pipe at 26a will have suction cuts inserted in the bottom of said pipe to pick up sludge to be removed from tank through valve and outlet at 26. A level gauge 27 is provided which will indicate the amount of water 28 and air 29 in the tank. Valves 30 are provided at either end of the gauge. A line 31 is a service water pipe connecting treating and settling tank 24 with finished water pressure tank 32. By means of line 31 and an air pressure equalizing line 33, the water level in both tanks will be maintained at an equal level indicated by the reference numerals 34. Line 33 is extended by means of pipe 35 to the downcomer for a purpose which will be explained later.

To provide the proper elevation, tank 32 rests on legs 36. A flushing line 37 is also provided. The treated water flows from finished water pressure tank 32 into a filtration tank 38 by means of a service pipe 39. The tank 38 contains a conventional sand filled filter. The finished water leaves tank 38 by a line 40 for general usage.

The chemical treatment process is of the conventional lime, soda ash type. As stated in the objects, while a conventional water softening plant is operated on a gravity flow with pressure built up by elevation of the water column, the instant device makes use of the pressure provided by pump 2. This holds the water in the tanks under a pressure using both water and air accumulation.

It will be apparent that as water is taken to service through lines 39 and 40, the pressures in the various tanks become unbalanced. The air pressure equalization lines 33 and 35 will continuously maintain the proper water level in tanks 24 and 32 and downcomer 15. This differential in pressure will be reflected back to automatic control switch 41, i.e., air pressure reduces until the water pressure automatic electric switch connects the current to the well water pump. The air that is trapped between the water pipe intake into the downcomer 15, and the water level in the downcomer and tank 24 along with the air in top of tank 32 controls the water level in all three units (15, 24 and 32) and the air pressure developed in all three units (15, 24 and 32) operates switch 41. Water well pump 2 provides water until such time as tank pressure has built up to a point where the water pressure control switch 41 shuts off. This means that if the water service requirements are equal to the volume of the water produced by the pump, the plant will operate continuously. Normally, water pump 2 operates for a short period of time until it builds up the pressure desired.

By this construction, a treating tank of approximately 8 feet in height may be used to what would be required by a gravity flow system of 80 feet in height.

The principles of the invention explained in connection with the specific exemplification thereon will suggest many other applications and modifications of the same. It is accordingly desired that, in construing the breadth of the appended claims they shall not be limited to the

What is claimed is:

1. A water softening plant comprising a first pump for providing water pressure; a chemical treatment tank; a treating and settling tank having a downcomer tube therein; first conveying means to convey water from said pump to said downcomer; a second pump included in said first conveying means to pump water from said chemical treatment tank to said downcomer; said downcomer being provided with means for mixing raw water and chemically treated water, said mixing means being a helical screw, a finished water pressure tank; second conveying means to convey water to said finished water pressure tank from said treating tank; air pressure equalization means including an air line having openings in said downcomer, said treating tank, and said finished water tank; and automatic cuton means responsive to a decrease in pressure in said treating and finished water tanks connected to said first and second pump means, whereby a decrease in pressure caused by water being consumed from said finished water tank will be reflected back to said automatic cuton means.

2. A water softening plant as defined in claim 1 wherein said first conveying means terminates in said downcomer.

References Cited by the Examiner

UNITED STATES PATENTS

| 1,523,856 | 1/1925 | Best | 210—258 X |
| 2,190,596 | 2/1940 | Corr | 210—49 |
| 2,239,612 | 4/1941 | Lawlor | 210—257 X |
| 2,268,076 | 12/1941 | Lawlor | 210—258 X |
| 2,811,258 | 10/1957 | Schleyer et al. | 210—205 X |
| 3,022,247 | 2/1962 | Selby et al. | 210—59 |

FOREIGN PATENTS

| 450,605 | 8/1948 | Canada. |
| 584,241 | 11/1924 | France. |

REUBEN FRIEDMAN, *Primary Examiner.*

D. M. RIESS, *Assistant Examiner.*